(12) United States Patent
Hirata et al.

(10) Patent No.: US 8,678,595 B2
(45) Date of Patent: Mar. 25, 2014

(54) PROJECTION TYPE DISPLAY APPARATUS WITH INCREASED LIFE OF OPTICAL CONSTITUENT COMPONENTS

(75) Inventors: Koji Hirata, Yokohama (JP); Nobuyuki Kimura, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 719 days.

(21) Appl. No.: 12/910,977

(22) Filed: Oct. 25, 2010

(65) Prior Publication Data

US 2011/0187999 A1 Aug. 4, 2011

(30) Foreign Application Priority Data

Jan. 29, 2010 (JP) ................................ 2010-017623

(51) Int. Cl.
*G03B 21/26* (2006.01)
*G03B 21/14* (2006.01)

(52) U.S. Cl.
USPC .............................................. 353/30; 353/20

(58) Field of Classification Search
USPC ........... 353/8, 20, 38, 30–31, 34, 37, 94, 122; 359/483.01, 484.01, 485.01, 485.03, 359/485.07, 489.07, 489.08, 489.11, 359/489.13, 622, 629; 362/19
See application file for complete search history.

(56) References Cited

U.S. PATENT DOCUMENTS

| | | | |
|---|---|---|---|
| 7,077,546 B2 * | 7/2006 | Yamauchi et al. | ............ 362/301 |
| 2006/0132725 A1 | 6/2006 | Terada et al. | |
| 2006/0274274 A1 * | 12/2006 | Adachi et al. | ................... 353/20 |
| 2009/0262308 A1 | 10/2009 | Ogawa | |
| 2009/0284148 A1 | 11/2009 | Iwanaga | |

FOREIGN PATENT DOCUMENTS

| | | |
|---|---|---|
| JP | 10-171045 | 6/1998 |
| JP | 2002-174852 | 6/2002 |
| JP | 2004-220015 | 8/2004 |
| JP | 2004-327361 | 11/2004 |
| JP | 2004-341105 | 12/2004 |
| JP | 2007-304610 | 11/2007 |
| JP | 2009-259583 | 11/2009 |
| JP | 2009-277516 | 11/2009 |

OTHER PUBLICATIONS

Office Action issued in Japanese Patent Application No. 2010-017623 on Aug. 20, 2013.

* cited by examiner

*Primary Examiner* — Pascal M Bui Pho
(74) *Attorney, Agent, or Firm* — Antonelli, Terry, Stout & Kraus, LLP.

(57) ABSTRACT

A projection type display apparatus including a light source, a display element, an illumination optical system and a projection lens to project a magnified image of the optical image. The illumination optical system includes a first array lens and a second array lens, each includes a plurality of lens elements arranged in a matrix, each of the lens elements having a rectangular opening, and a polarization conversion element having polarization conversion function by use of a plurality of polarized beam splitters and a plurality of half-wave phase plates, arranged in an array and opposing to the lens elements of the second array lens, to emit predetermined polarized light. The light source includes a light emitting plane of a rectangle or an ellipse shape, a longitudinal direction of the light emitting plane being parallel to a longitudinal direction of each opening of the polarization conversion element.

4 Claims, 7 Drawing Sheets

PROJECTION TYPE DISPLAY APPARATUS WITH INCREASED LIFE OF OPTICAL CONSTITUENT COMPONENTS

INCORPORATION BY REFERENCE

The present application claims priority from Japanese application JP-2010-017623 filed on Jan. 29, 2010, the content of which is hereby incorporated by reference into this application.

BACKGROUND OF THE INVENTION

The present invention relates to projection type display apparatus which projects an image onto a projection plane by use of a display element such as a liquid-crystal panel and an illumination optical system including a light source not using mercury, for example, a light emitting diode, a laser, and a phosphor, and in particular, to a technique to provide a projection type display apparatus including a combination of the projection type display apparatus and the illuminating optical system.

For example, for a projection type display apparatus for displaying on a projection plane, e.g., a screen or a board, a magnified image of a display screen of a display element configured by arranging therein a plurality of liquid-crystal panels and a plurality of small mirrors of reflection or transmission type, an illumination optical system of the display apparatus has been developed to obtain the magnified image with sufficient dimensions and brightness on the projection plane.

Particularly, in display apparatus employing a plurality of display elements, various illumination optical systems have been proposed to suppress deterioration in white balance of color images and to prevent color shading of color images. For example, according to a projection type display apparatus described in JP-A-10-171045, an illumination optical system of the projection type display apparatus includes a light source which is primarily an extra-high pressure mercury lamp having a high light emission efficiency per input power (70 lm/W). Also, in the development of illumination optical systems, to improve the light transmission ratio in a first array lens and a second array lens, it is highly desired to reduce distance between electrodes thereof.

Such extra-high pressure mercury lamp generates a large amount of ultraviolet rays and hence imposes stress onto organic substances such as a liquid-crystal light valve and a sheet polarizer included in an illumination optical system, resulting in short life of the mercury lamp. This possibly leads to a problem in which since the light transmission capability of the illuminating optical system is deteriorated due to wear of electrodes and opaqueness appearing in a light emitting tube, brightness of the mercury lamp is lowered in a short period of time.

To overcome this difficulty, research and development and various proposals have been made for projection type display apparatus employing solid light emitting elements such as red, green, blue light emitting diodes and organic electroluminescence (EL) elements. For example, JP-A-2004-341105 proposes a light source device including a solid light source, a phosphor layer to convert an ultraviolet ray emitted from the solid light source into visible light, and a transparent substrate.

Also, to solve the problem of JP-A-2004-341105, there has been proposed in, for example, JP-A-2009-277516 an optimal source device in which an excitation light radiated from a solid light source is emitted also as visible light with high efficiency.

In addition, for example, JP-A-2009-259583 proposes a light source of a projection type display apparatus including a combination of light sources utilizing different light emitting principles.

According to the technique described in JP-A-2004-341105, the light source device includes a solid light source, a phosphor layer to convert an ultraviolet ray emitted from the solid light source into visible light, and a transparent substrate. Since the technique employs an excitation light source in which an ultraviolet ray having high energy is used as the excitation light, optical elements onto which the ultraviolet ray is radiated are likely to be damaged. It is accordingly difficult to secure a long-term performance of the optical elements. To solve the problem, JP-A-2009-277516 has proposed a technique in which visible light having lower energy than the ultraviolet ray is radiated as the excitation light onto the phosphor.

On the other hand, for projection type display apparatus, JP-A-2009-259583 proposes a new light source combining a plurality of light sources of different light emission schemes. According to the proposal, the new light source includes a first light source which is a light emitting diode or a solid light emitting element to emit light with a predetermined wavelength, a second light source which is a light emitting diode or a solid light emitting element to emit excitation light, and a third light source which uses the excitation light from the second light source as excitation energy to emit light with a wavelength equal to that of the light from the first light source.

The conventional techniques disclosed in JP-A-2004-341105, JP-A-2009-277516, and JP-A-2009-259583 are techniques for the light sources, and consideration has not been given to matching of the light source with the illumination optical system of the projection type display apparatus employing a liquid-crystal display element. Hence, in spite of the long life of the light source itself, the long life cannot be necessarily guaranteed when it is employed as the light source of the projection type display apparatus.

SUMMARY OF THE INVENTION

Description will now be given of problems which take place in the illuminating optical system of the projection type display apparatus utilizing a liquid-crystal display element when a light source including a light emitting diode is employed as a new light source not using an extra-high pressure mercury lamp.

In the drawings, the same constituent components will be assigned with the same reference numeral. For constituent components already described, repetitive description thereof will be avoided. For easy understanding, an orthogonal coordinate system will be introduced to the drawings. A z axis is taken in a direction of an optical axis of illumination light. A y axis is taken in a direction parallel to a longitudinal side of a rectangular effective emission area of a liquid-crystal display element in a plane vertical to the z axis. An x axis is taken in a direction parallel to a vertical side of the rectangular effective emission area. That is, lens cells employed for a first array lens and a second array lens are arranged in the x-axis and y-axis directions.

FIGS. 5A to 5C illustrate optical elements disposed in an optical path from a light source to a liquid-crystal display element of an illumination optical system in projection type display apparatus employing a light source including light emitting diodes and a polarization conversion integrator. FIG.

5A illustrates primary constituent components of the illuminating optical system in a y-z cross section including the optical axis of illumination 100 viewed from the x-axis direction. FIG. 5B illustrates an outline of a light source image formed on a polarization conversion element 5. FIG. 5C illustrates an outline of a light source image formed on the second array lens 4.

In FIG. 5A, light emitted from the light source including light emitting diodes 1 is substantially collimated through a collimator lens 2 to enter the polarization conversion integrator. The integrator includes an optical integrator including the first array lens 3 and the second array lens 4 to conduct uniform illumination and a polarization conversion element 5 to align the direction of polarization of light to a predetermined direction of polarization.

The first array lens 3 includes a plurality of lens cells arranged in a matrix and separates incident light thereto into a plurality of light rays through the lens cells to allow the rays efficiently pass through the second array lens 4 and the polarization conversion element 5.

That is, for the first array lens 3, a relationship between an object and an image (conjugate relationship) exists between the light emitting plane of the light source 1 and each lens cell of the second array lens 4. It is required that the rays having passed through the lens cells of the first array lens 3 enter the cells of the second array lens 4 opposing thereto.

Similarly to the first array lens 3, the second array lens 4 includes a plurality of lens cells arranged in a matrix and each of the lens cells projects the contour of a lens cell of the first array lens 3 corresponding thereto onto a liquid-crystal display element 18. Therefore, the liquid-crystal display element 18 is substantially equal in aspect to the lens cells of the first array lens 3 and second array lens 4.

In this situation, the rays from the second array lens 4 are aligned in a predetermined direction of polarization by the polarization conversion element 5. The projection images of the lens cells of the first array lens 3 are respectively projected via a focusing lens 6 and a condenser lens 13 onto the liquid-crystal display element 18 to be superimposed onto each other.

For the second array lens 4 and the focusing lens 6 closely disposed thereto, since a conjugate relationship between an object and an image exists between the first array lens 3 and the display element 18, a plurality of light rays divided by the first array lens 3 are projected via the second array lens 4 and the focusing lens 6 onto the liquid-crystal display element 18 to be superimposed. It is hence possible to illuminate with a highly uniform illuminance distribution at a level proving practically no problem.

Referring to FIGS. 6A and 6B, description will now be given of a configuration of the polarization conversion element 5 before the problems of the illumination optical system employing the light source of light emitting diodes and the polarization conversion integrator.

FIGS. 6A and 6B illustrate a configuration of a primary section of the polarization conversion integrator. FIG. 6A is a y-z cross section of the integrator viewed from an x-axis direction. FIG. 6B illustrates details of the polarization conversion element in a magnified view.

In FIGS. 6A and 6B, the polarization conversion element 5 includes prism-shape light transmitting members 51 having a cross section of a parallelogram and extending in the x-axis direction (vertical to the surfaces of FIGS. 6A and 6B) parallel to, for example, a shorter side of the liquid-crystal display element. A plurality of the prism-shape light transmitting members 51 are arranged in an array in a y-axis direction in parallel with an x-y plane vertical to the direction of the illumination light axis 100 (z-axis direction). On the boundary faces between the light transmitting members 51 arranged as above, a polarized beam splitter (hereafter, abbreviated as PBS) film 52 and a reflection film 53 are alternately formed. In general, an organic adhesive is utilized to fix the light transmitting members 51 to each other.

On a light emitting plane of the polarization conversion element 5 to emit the light having passed through an opening 55 on a light incidence side and the PBS film 52 of the polarization conversion element 5, a λ/2 (half wave) plate 54 is arranged. For the half wave plate 54, a low-price organic phase-difference film is available and has been adopted in many liquid-crystal projectors. To elongate the life of the half wave plate 54, a phase difference plate including two sheets of inorganic quartz which are laminated onto each other has been also employed, and generally, an organic adhesive is used to fix the sheets of quartz onto each other.

In FIGS. 6A and 6B, the polarization conversion element 5 is symmetrically arranged with respect to a plane S100 defined by the illumination optical axis 100 and the extending direction (x-axis direction) of the parallelogram-pole light transmitting member 51 (an x-z plane including the illumination optical axis 100 to be referred to as "optical axis plane" hereafter). The light transmitting member 51 is inclined 45° upward relative to the optical axis plane S100 on the right-hand side of each of FIGS. 6A and 6B and 45° downward with relative to the optical axis plane S100 on the left-hand side of each of FIGS. 6A and 6B. Naturally, the PBS film and the reflection film are symmetrically ordered with respect to the optical axis plane S100: on the right-hand side relative to the optical axis plane S100 of each of FIGS. 6A and 6B, they are sequentially formed in the order, a PBS film, a reflection film, a PBS film, a reflection film, and so forth, from the optical axis 100 toward the right-hand side; while on the left-hand side relative to the optical axis plane S100 of each of FIGS. 6A and 6B, they are sequentially formed in the order, a PBS film, a reflection film, a PBS film, a reflection film, and so forth, from the optical axis 100 toward the left-hand side.

The openings 55 are disposed on the light incidence side of the polarization conversion element 5, and each is an elongated narrow area defined by a longer side extending in the x-axis direction and a shorter side extending in the y-axis direction.

In the polarization conversion element 5 configured as above, for example, an s-polarized light of light L incident to one of the openings 55 (e.g., the opening $55_6$) via the first array lens 3 and the second array lens 4 is reflected by the PBS film 52 and is again reflected by the opposing reflection mirror 53 to be emitted as S-polarized light from the polarization conversion element 5. On the other hand, P-polarized light of the light L is transmitted through the PBS film 52 and is converted by the half wave plate 54 on the light emitting plane into S-polarized light, which is then emitted from the polarization conversion element 5. The polarization conversion element 5 includes a plurality of (for example, six in FIGS. 6A and 6B) these basic polarization conversion sections 50, and has a polarization conversion function in which the direction of the polarization of light incident to the polarization conversion section is aligned to a predetermined direction of polarization (S-polarization in this configuration).

When light enters an area between the openings (e.g., an area $60_5$ between the openings $555$ and $55_6$), the polarization conversion element 5 emits light having a polarization angle of 90° rotated relative to the predetermined polarization angle (P-polarized light in this case). That is, the polarization conversion ratio is deteriorated. To overcome the difficulty, a plate of aluminum or the like is ordinarily arranged between the openings to form a light shielding section 60 to shield light.

Incidentally, to identify the polarization conversion section, the opening, and the light shielding section hereafter, numerals 1 to 6 are assigned thereto from the left-most position of FIGS. 6A and 6B.

Next, description will be given of problems appearing in the illumination optical system which employs the light source including light emitting diodes and the polarization conversion integrator.

Assume in FIGS. 5A to 5C that the light source of light emitting diodes 1 is apart from the focusing lens 2 by a distance A and the first array lens 3 is apart from the second array lens 4 by a distance B. In this configuration, since the light source 1 is at the focal point of the focusing lens 2, the distance A is the focal length of the focusing lens 2. Also, since the second array lens 4 is placed in the vicinity of the substantial focal point of the first array lens 3, the distance B is the focal length of the first array lens 3.

As described above, the first array lens 3 is designed such that a conjugate relationship between an object and an image exists between the light source 1 and each lens cell of the second array lens 4. Hence, a second light emission image 26 is formed on each lens cell of the second array lens 4. Since the second array lens 4 is placed in the vicinity of the polarization conversion element 5, the second light emission image 26 formed on each lens cell of the second array lens 4 is similarly formed on the polarization conversion element 5. A magnification factor β of the second light emission image 26 with respect to the light source 1 is approximately represented by Equation 1 using the distances A and B.

$$\beta = B/A \quad \text{(Equation 1)}$$

At a position apart from the illumination optical axis 100, the distance A becomes relatively long. Hence, the images projected on the second array lens 4 and the polarization conversion element 5 are reduced in size.

FIG. 5B illustrates the second light emission image 26 formed on the polarization conversion element 5. FIG. 5C illustrates the second light emission image 26 formed on the second array lens 4. In this configuration, the second array lens 4 includes eight rows in the x-axis direction and six columns in the y-axis direction. Each lens cell 40 of the second array lens 4 is assigned with numeral i (1~6) indicating an associated column and numeral j (1~8) indicating an associated row.

Description will now be given of the density of light which passes through each opening of the polarization conversion element 5 under the circumstance described above. Consideration will be first given to the second light emission image 26 formed on a lens cell 40₄₄ adjacent to the illumination optical axis 100 of the polarization conversion element 5.

FIG. 3A represents dimensions of the second array lens 4, the opening of the polarization conversion element 5, and the second light source image 26 when the liquid-crystal element has an aspect ratio of M:N and the light emitting plane of the light source I has a general aspect ratio of 1:1. Also, FIG. 3B represents dimensions of a light emitting plane 90 of the light source 1. When the lens cell 40₄₄ has a length of M×H in the y-axis direction, the opening aspect ratio of each lens cell is about M:N as described above. Hence, the lens cell 40₄₄ has a length of N×H in the x-axis direction.

However, since the light shielding plate of the polarization conversion element 5 shields half the incident light in the y-axis direction, the effective opening aspect ratio is M/2:N and the opening has a length of M×H/2 in the y-axis direction.

On the other hand, assuming that each side of the light emitting plane 90 of the light source 1 has a length of L, the associated side of the second light source image 26 becomes L×β. The relational expression for the second light source image 26 to entirely pass through the opening of the lens cell 40₄₄ is represented by Equation 2.

$$M \times H/2 \geq L \times \beta \quad \text{(Equation 2)}$$

The second light source image 26 is largest in size at the lens cell 40₄₄. If Equation 2 holds for the lens cell 40₄₄, the second light source image 26 passes through any opening of the second array lens 4 and the polarization conversion element 5. In this situation, although Equation 2 holds even if the magnification factor β is reduced, the area of the second light source image 26 is reduced and the density of light becomes higher in the polarization conversion element 5 so that this brings about a problem of the life of the polarization conversion element 5 including organic members. The condition which minimizes the density of light without reducing the light utilization efficiency is expressed as Equation 3.

$$M \times H/2 \approx L \times \beta \quad \text{(Equation 3)}$$

The ratio of the area of the second light source image 26 to that of the opening of the polarization conversion element 5 is represented by Equation 4. By substituting Equation 3, Equation 4 results in M/(2N) as next.

$$((L \times \beta) \times (L \times \beta))/(M \times H/(2 \times N \times H)) \approx M/(2N) \quad \text{(Equation 4)}$$

Assuming that the aspect ratio of the liquid-crystal display element is 4:3 of the general resolution XGA, the result derived from Equation 4 is reduced to ⅔ (66.7%). That is, one third of the effective opening is not illuminated by light, while the light illuminated onto the polarization conversion element 5 still has a high density of light. At a position apart from the illumination optical axis 100, the area of the second light source image 26 is further reduced. However, since the light illuminated from the light emitting diodes has the Lambert distribution in which the maximum value appears at the illumination optical axis 100, the density of light takes a largest value in the proximity of the illumination optical axis 100. This accordingly causes a problem in which phase plates and adhesives included in the polarization conversion element 5 are colored from a position near the central position and hence the light transmission ratio is lowered. That is, although the light source has a long life, when the light source is used in the display apparatus, it will be difficult to sustain the long life of the display apparatus.

It is therefore an object of the present invention, which has been devised in consideration of the problems, to provide a highly efficient projection type display apparatus in which the life of optical constituent components of the illumination optical system is less reduced as compared with the prior art, even when a solid light source such as a light emitting diode or a laser is used as a part of excitation light and a light source, or when a light source emitting excitation light to cause a phosphor to emit light is employed.

To achieve the object according to the present invention, there is provided a projection type display apparatus including a light source, a display element, an illumination optical system including a plurality of optical elements to emit light from the light source, to the display element, and a projection lens to magnify an optical image formed by the display element and to project a magnified image of the optical image, in which the illumination optical system includes a first array lens and a second array lens which each includes a plurality of lens elements arranged in a matrix, each of the lens elements having a shape of a rectangular opening and a polarization conversion element having a polarization conversion function to emit light having a predetermined polarization direction of light by use of a plurality of polarized beam splitters and a plurality of half-wave plates, the beam splitters and the phase plates being arranged in an array to oppose to the lens elements of the second array lens, and to emit desired polarized light having the predetermined polarization direction, and in which the light source includes a light emitting plane having a shape of substantially a rectangle or an ellipse, the longitudinal direction of the shape of the light emitting plane being parallel to the longitudinal direction of each opening of the polarization conversion element.

In the projection type display apparatus, when a ratio of a length in the longitudinal direction to a length in a vertical direction vertical to the longitudinal direction is M/N (M>N), a ratio of a length in the longitudinal direction of the light emitting plane of the light source to a length in the vertical direction thereof is less than (4N×N)/(M×M).

Also, the light source includes solid light emitting elements such as light emitting diodes, lasers, and organic electroluminescence elements. Alternatively, the light source includes solid light emitting elements such as light emitting diodes, lasers, and organic electroluminescence elements, emitting excitation light to excite a phosphor. Alternatively, the light source includes solid light emitting elements such as light emitting diodes, lasers, and organic electroluminescence elements, the solid light emitting elements emitting light which is diffused in a diffusion layer.

According to the present invention, there is provided a projection type display apparatus in which when the long-life light source, e.g., the light emitting diode or the laser is employed, it is also possible to elongate the life of the illumination optical system as compared with the prior art.

Other objects, features and advantages of the invention will become apparent from the following description of the embodiments of the invention taken in conjunction with the accompanying drawings.

DESCRIPTION OF THE EMBODIMENTS

Figure 1A:
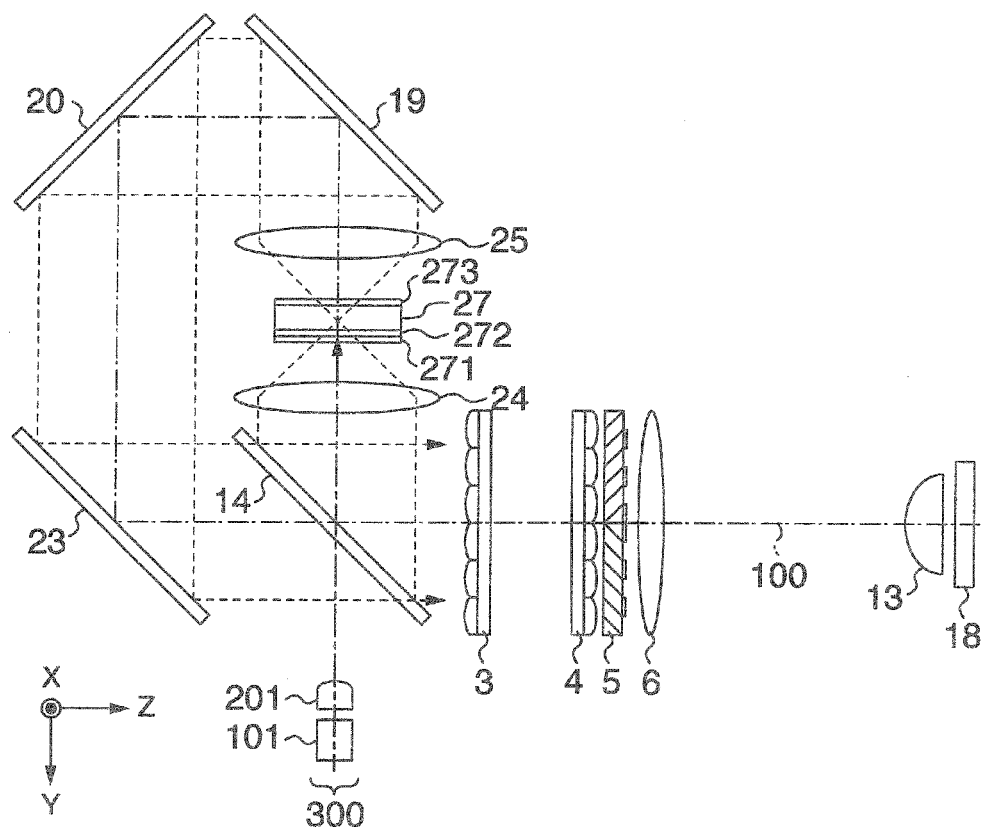
FIG. 1A is a schematic diagram illustrating a configuration of a primary section of an illumination optical device according to a first embodiment.

Referring now to the drawings, description will be given of an embodiment of the present invention. In the drawings, the same constituent components are assigned with the same reference numeral. For constituent components once described, repetitive description will be avoided. For easy understanding in the description as in the description of the problems above, an orthogonal coordinate system in which the z axis is set to the illumination optical axis will be introduced to the drawings. That is, in a plane vertical to the z axis, the direction parallel to the longitudinal side of a rectangular effective irradiation area of a liquid-crystal display element is set to the y axis and the direction parallel to the vertical side of the rectangular effective irradiation area is set to the x axis. The x axis is parallel to the longitudinal side of the opening of the polarization conversion element, and the y axis is parallel to the vertical side of the opening.

In the embodiment, the light source device has been appropriately devised to elongate the life of the polarization conversion element. Although details will be described later, the longitudinal side of the light emitting section to emit the first emission image is parallel to the longitudinal side of the opening of the polarization conversion element included in the polarization conversion integrator in a plane substantially vertical to the illumination optical axis. The light emission density is advantageously reduced for the polarization conversion element.

Figure 4A:
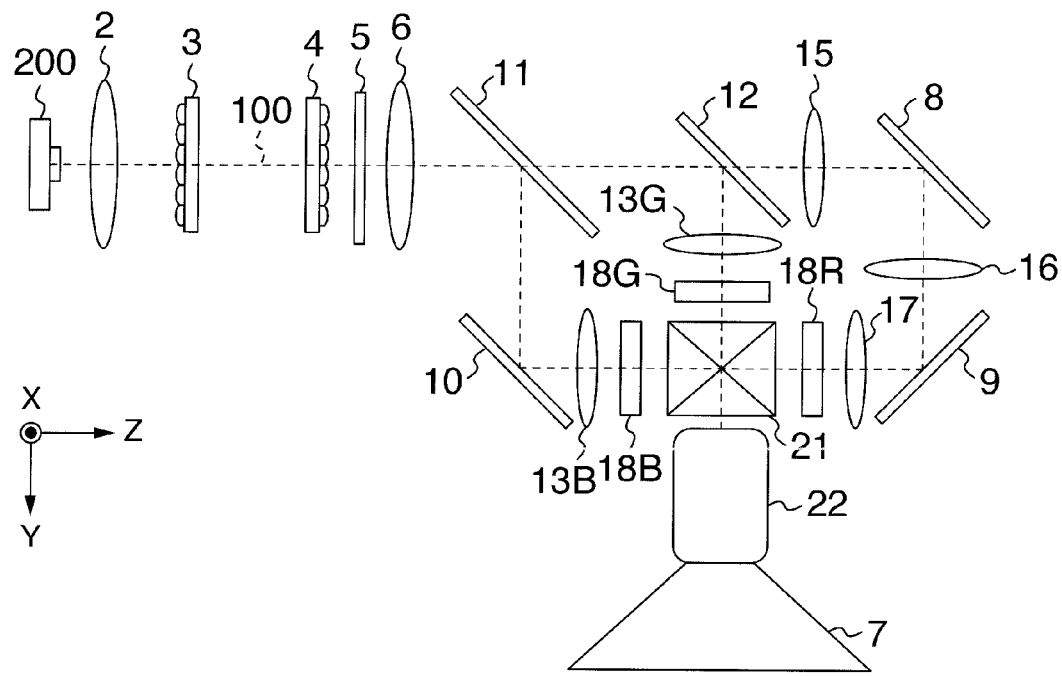
FIG. 4A is a schematic diagram illustrating an optical system of a projection type display apparatus employing a light source device according to an embodiment of the present invention.
Figure 4B:
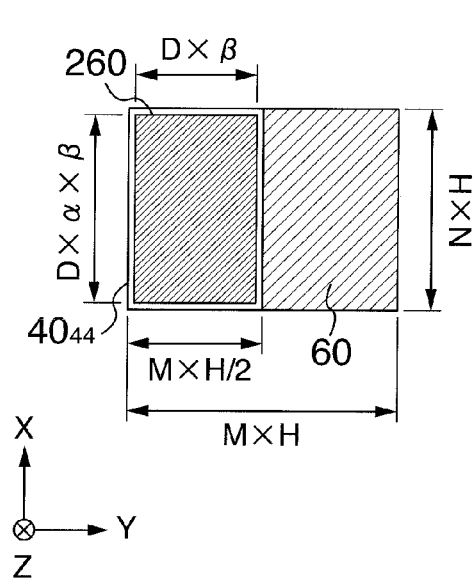
FIG. 4B is a schematic diagram representing an outline of light source images formed on a polarization conversion element and a second array lens.
Figure 4C:
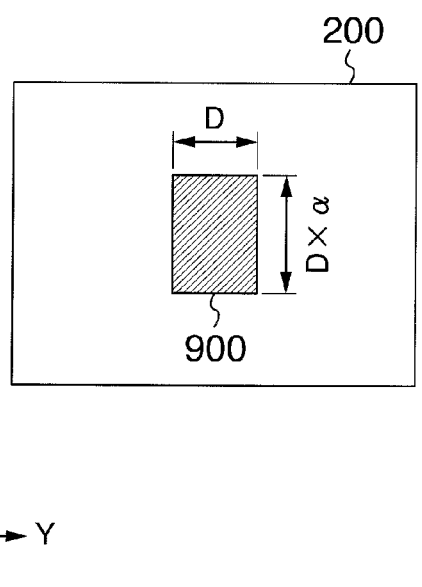
FIG. 4C is a diagram representing a contour of a light emitting plane of the light source.
Figure 5A:
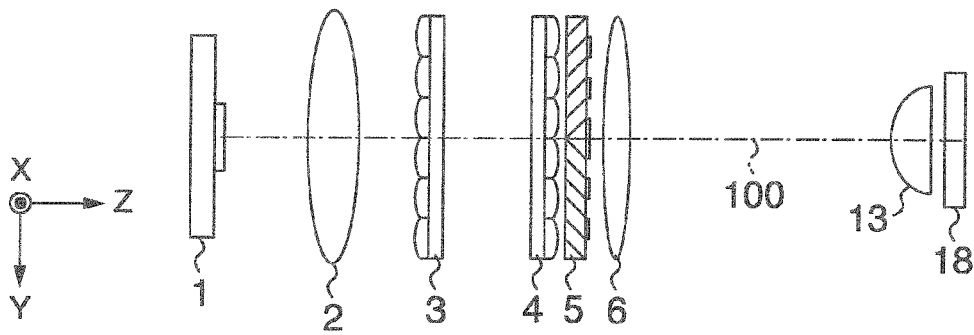
FIG. 5A is a diagram illustrating an outline of an illumination optical system from a light source to a liquid-crystal display element according to the prior art.
Figure 5B:
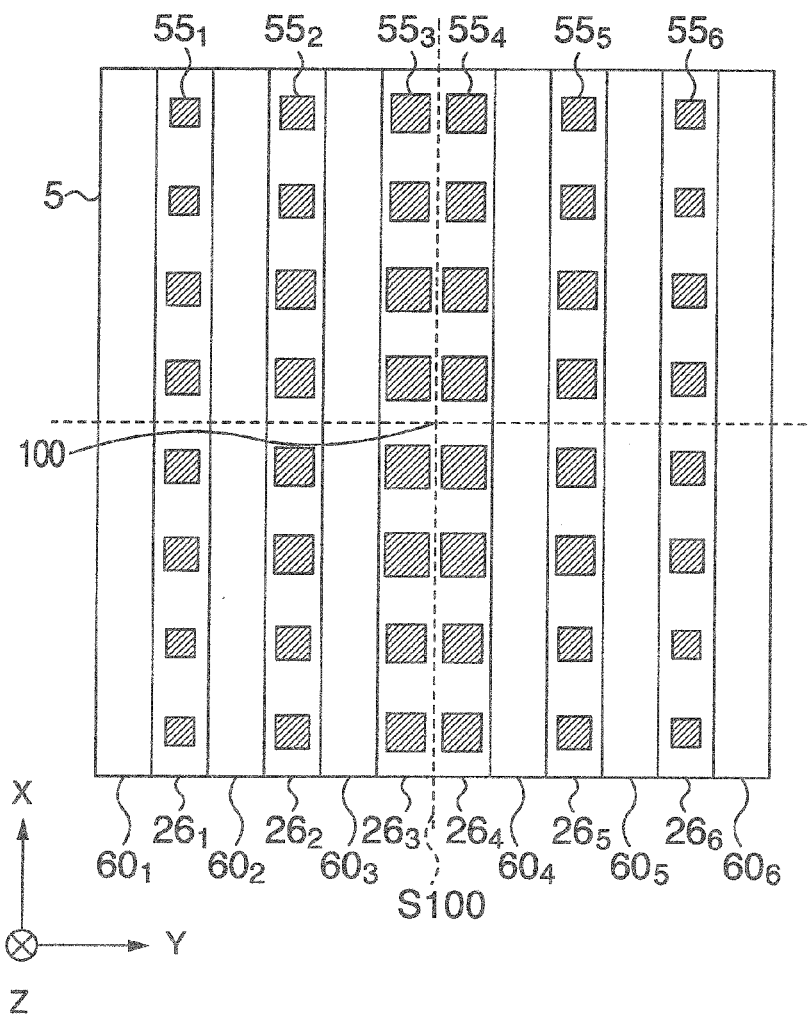
FIG. 5B is a diagram illustrating an outline of a light source image formed on a polarization conversion element according to the prior art.
Figure 5C:
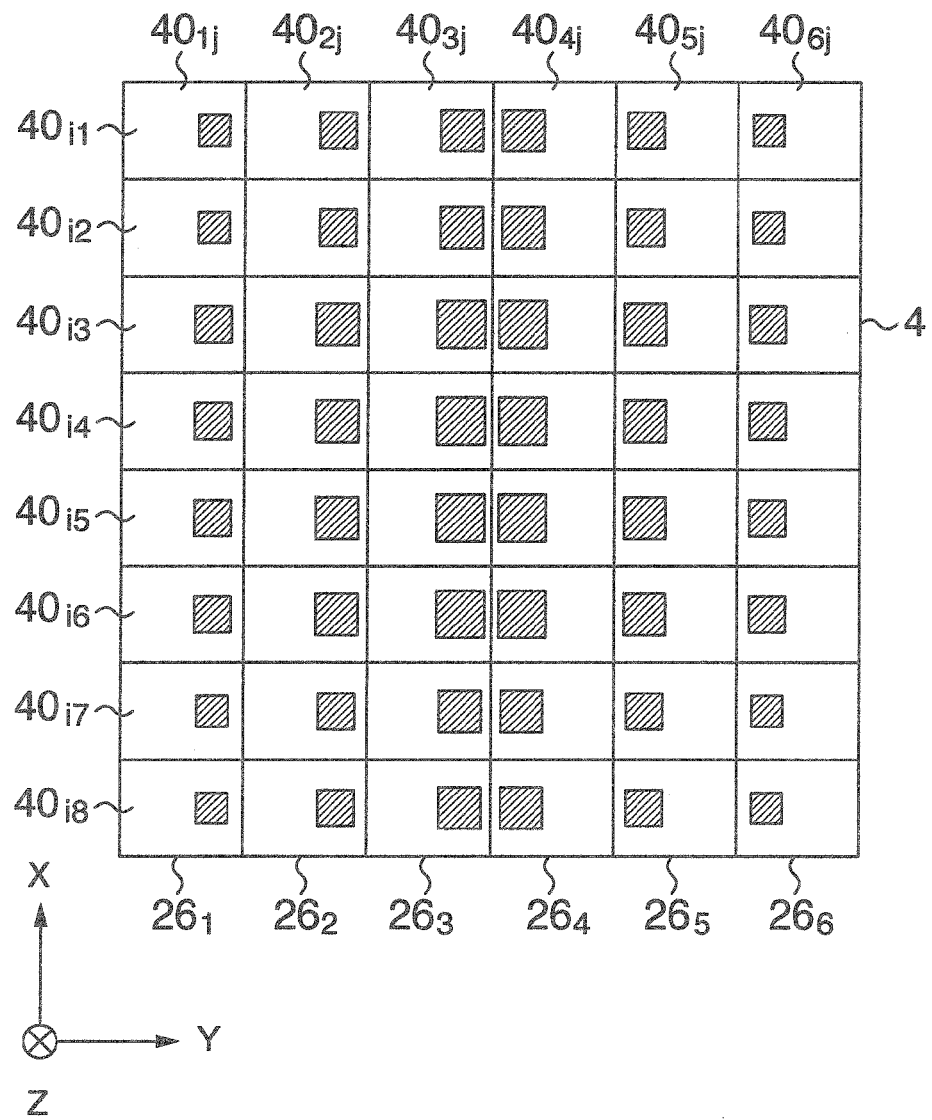
FIG. 5C is a diagram illustrating an outline of a light source image formed on the second array lens according to the prior art.
Figure 6A:
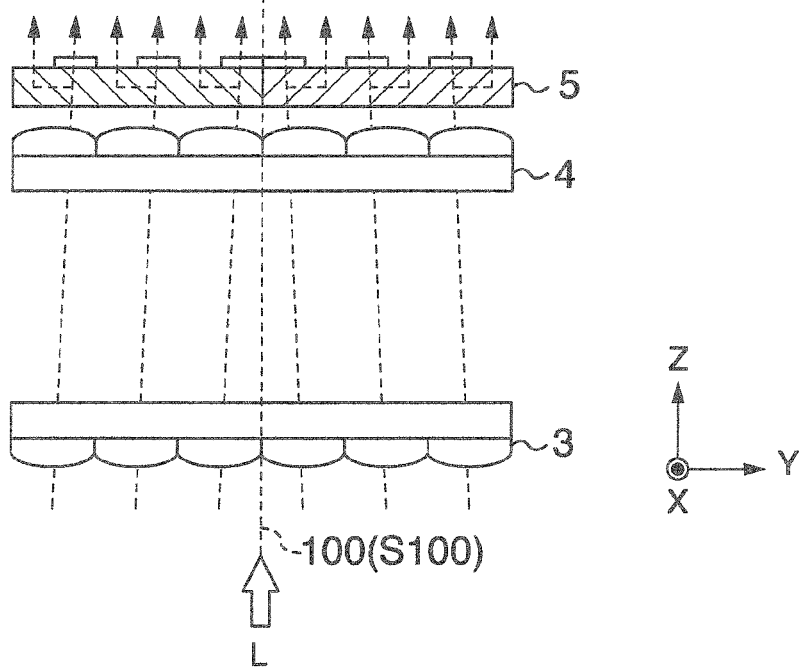
FIG. 6A is a magnified view of a primary section of a polarization conversion integrator.
Figure 6B:
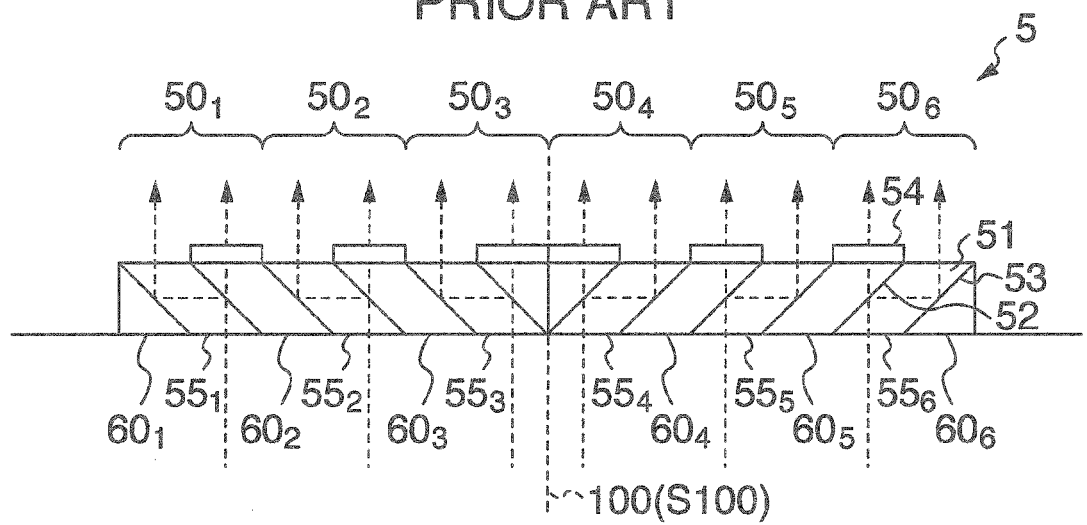
FIG. 6B is a cross-sectional view illustrating in detail the primary section of a polarization conversion integrator.

FIGS. 4A to 4C are schematic diagrams representing an outline of an optical system of a projection type display apparatus employing a light source device according to an embodiment. FIG. 4A is a diagram schematically illustrating a configuration of an illumination optical system in a y-z cross section including an illumination optical axis viewed from the x-axis direction. FIG. 4B is a diagram representing an outline of light source images formed on the polarization conversion element 5 and the second array lens 4. FIG. 4C is a diagram representing a contour of a light emitting plane 900 of a light source 200.

In FIG. 4A, white light emitted from the light source 200 is substantially collimated through a collimator lens 2 to enter a polarization conversion integrator. The light source 200 provides excitation light from a solid light emitting element such as a light emitting diode or from a phosphor excited by a solid light emitting element. The polarization conversion integrator includes an optical integrator including the first array lens 3 and the second array lens 4 to conduct uniform illumination and a polarization conversion element 5 to change the direction of polarization of light into a predetermined direction of polarization.

The first array lens 3 includes a plurality of lens cells arranged in a two-dimensional matrix. Each of the lens cells has a rectangular shape substantially similar to that of the liquid-crystal display element when viewed from the direction of the illumination optical axis. The first array lens 3 divides the incident light from the light source into a plurality of light rays through the lens cells to guide the rays efficiently pass through the second array lens 4 and the polarization conversion element 5. That is, the first array lens 3 is designed such that an optically conjugate relationship exists between the light emitting plane of the light source 200 and each lens cell of the second array lens 4.

Similarly to the first array lens 3, the second array lens 4 includes a plurality of lens cells arranged in a matrix each of which having a rectangular shape when viewed from the direction of the illumination optical axis, and each lens cells projects or maps the contour of the lens cell of the first array lens 3 corresponding thereto onto a liquid-crystal display element 18.

In the operation, the rays from the second array lens 4 are aligned in a predetermined direction of polarization by the polarization conversion element 5. On the liquid-crystal display element 18, respective projected images of the lens cells of the first array lens 3 are superimposed each other via a focusing lens 6, condenser lenses 13 and 14, a first relay lens 15, a second relay lens 16, and a third relay lens 17.

The second array lens 4 and the focusing lens 6 closely placed thereto are designed such that each lens cell of the first array lens 3 and the display element 18 satisfy an optically conjugate relationship. Accordingly, the light rays divided by the first array lens 3 are projected via the second array lens 4 and the focusing lens 6 onto the liquid-crystal display element 18 to be superimposed to each other. It is hence possible to illuminate with a highly uniform illuminance distribution at a level providing practically no problem.

As described above, while converting the polarization direction of randomly polarized light rays emitted from the light source into the predetermined polarization direction, the polarization conversion integrator including the first array lens 3, the second array lens 4, and the polarization conversion element 5 uniformly emits the polarized light rays onto the liquid-crystal display element.

In the process, for example, B-light (blue-range light) is reflected by a dichroic mirror 11. G-light (Green-range light) and R-light (red-range light) are transmitted through the dichroic mirror 11 as two-color light including the G-light and R-light. The G-light and the R-light are then separated from each other through a dichroic mirror 12. For example, the G-light is reflected by the dichroic mirror 12 and the R-light is transmitted through the dichroic mirror 12. As a result, the original light is separated into rays of three colors, respectively. The separation of light rays may be carried out in various ways. For example, it is possible to reflect the R-light by the dichroic mirror 11, and the G-light and the B-light are transmitted through the dichroic mirror 11. Alternatively, it is possible to reflect the G-light by the dichroic mirror 11, and the R-light and the B-light are transmitted through the dichroic mirror 11.

The B-light reflected by the dichroic mirror 11 is again reflected by a reflection mirror 10. The reflected B-light passes through a condenser lens 13B and a liquid-crystal display element 18B for B-light to enter a light mixing prism 21.

Of the G-light and the R-light having passed through the dichroic mirror 11, the G-light is reflected by the dichroic mirror 12 and then passes through a condenser lens 13G to enter a liquid-crystal display element 18G for G-light.

The R-light passes through the dichroic mirror 12 and is focused through the first relay lens 15 to be reflected by a reflection mirror 8. The reflected R-light is further focused by the second relay lens 16 to be reflected by a reflection mirror 9 and is then focused by the third relay lens 17 to enter a liquid-crystal display element 18R for R-light. The R-light passes through the liquid-crystal display element 18R to enter the light mixing prism 21.

The B-light, G-light, and R-light having passed through the respective liquid-crystal display elements are mixed by the light mixing prism 21 into a color image. The color image passes through a projection lens 22 such as a zoom lens to reach a screen 7. An optical image formed on each liquid-crystal display element through an optical intensity modulation is projected by the projection lens 22 as a magnified image onto the screen 7, to thereby implement a display function of the display apparatus.

Although no relay lens is disposed in the first light path (for B-light) and the second light path (for G-light), a relay lens 15 is arranged in the third light path (for R-light) to equalize the light path lengths to each other for the first, second, and third light paths. In this configuration, white light is used for the light source 200. However, it is also possible that by using three light sources including a B-color light source, a G-color light source, and an R-color light source, three colors are mixed with each other by a color mixing prism or the like immediately before the first array lens 3 such that the resultant light enter the first array lens 3.

Referring now to FIGS. 4B and 4C, description will be given of elongation of life of the display apparatus according to the present embodiment.

Description will be first given of the density of light which passes through an opening of the polarization conversion element 5 in consideration of the second light source image 26 formed on a lens cell 40$_{44}$ adjacent to an illumination optical axis 100 of the polarization conversion element 5.

Assume that the liquid-crystal display element has an aspect ratio of M/N (M>N), the longitudinal direction is set to the y-axis direction, and an aspect ratio of the longitudinal side of the light emitting plane of the light source 200 to the vertical side thereof is α. FIG. 4B represents a relationship between the openings of the second array lens 4, the polarization conversion element 5 and a second light source image 260, while FIG. 4C represents a light emitting plane 900 of the light source 200.

When the lens cell 40$_{44}$ has a y-axis directional length of M×H, each lens cell of the second array lens 4 has an opening aspect ratio of about M:N as described above. Hence, the lens cell 40$_{44}$ has an x-axis directional length of N×H.

However, since a light shielding plate 60 of the polarization conversion element 5 interrupts half the light in the y-axis direction, the effective opening aspect ratio is M/2:N, so that the opening length becomes M×H/2 in the y-axis direction. On the other hand, when the y-axis directional length of one side of the light emitting plane 900 of the light source 200 is represented by D, the x-axis directional length is D×α. Assuming that the magnification factor is β, the second light source image 260 has a y-axis directional length of D×β and an x-axis directional length of D×α×β. The relational expression for the second light source image 260 to entirely pass through the opening of the lens cell 40$_{44}$ is represented by Equation (5).

$$N \times H \gtrsim D \times \alpha \times \beta \quad (5)$$

In this situation, the condition which minimizes the density of light without reducing the light utilization efficiency is expressed by Equation (6).

$$N \times H \approx D \times \alpha \times \beta \quad (6)$$

In addition, the ratio of the area of the second light source image 260 to that of the opening of the polarization conversion element 5 is represented by Expression (7).

$$((D\times\beta)\times D\times\alpha\times\beta))/((M\times H/2)\times(N\times H)) \quad (7)$$

On the other hand, the ratio of the area of the second light source image 260 to that of the opening of the polarization conversion element 5 is M/(2N) according to Equation (4) in the prior art. Hence, in the present embodiment, the condition to reduce the density of light in the polarization conversion element 5 is expressed as below.

$$((D\times\beta)\times D\times\alpha\times\beta))/((M\times H/2)\times(N\times H))>M/(2N) \quad (8)$$

In this situation, Equation (9) holds for α.

$$\alpha<(4N\times N)/(M\times M) \quad (9)$$

That is, in a situation wherein the liquid-crystal display element has the aspect ratio of M/N (M>N) and the longitudinal direction is set to the y-axis direction, if the ratio of the longitudinal length of the light emitting plane of the light source to the vertical length of the light emitting plane is less than (4N×N)/(M×M), the density of light radiated onto the polarization conversion element 5 is lowered as compared with the prior art. This elongates the life of organic members included in the polarization conversion element 5.

As above, according to the embodiment, there is provided a projection type display apparatus wherein when the long-life light source, e.g., the light emitting diode or the laser is employed, it is also possible to elongate the life of the illumination optical system.

[First Embodiment]

Referring to FIGS. 1A and 1B and FIGS. 2A to 2C, description will be given of an aspect ratio of a light source of the present embodiment in which the density of light can be reduced in the polarization conversion element and the life thereof can be elongated as compared with the prior art (the aspect ratio of the light source is 1:1). The embodiment includes a light source in which a yellow phosphor is excited by blue excitation light to emit yellow light. A light source of the blue excitation light is a solid light emitting element, e.g., a light emitting diode or a laser.

Figure 1B:
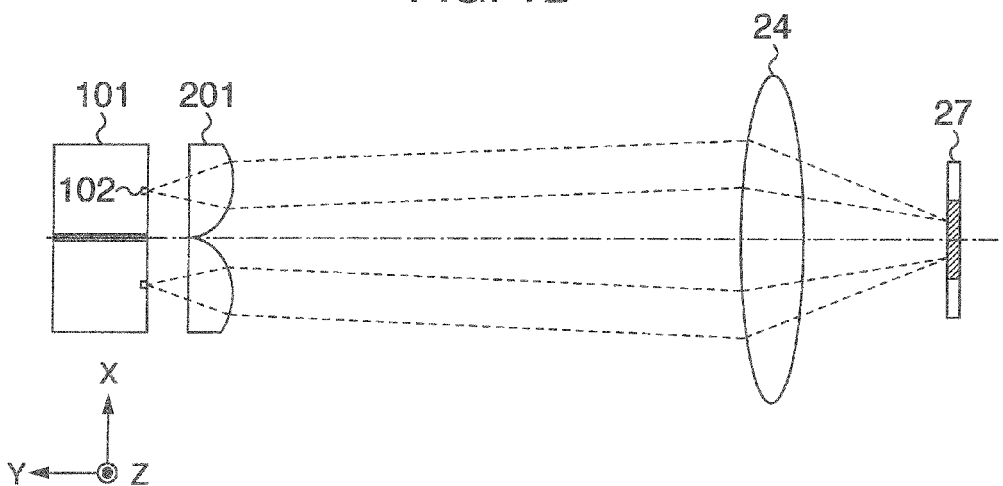
FIG. 1B is a schematic diagram illustrating a configuration of a primary section, specifically, an x-y cross-section viewed from a z-axis direction.

FIG. 1A schematically illustrates a configuration of a primary section of an illumination optical device in a first embodiment, specifically, a y-z cross-section including an illumination optical axis viewed from an x-axis direction. FIG. 1B illustrates a configuration of the primary section ranging from a blue excitation light source 1 to a transparent member 27, specifically, an x-y cross section viewed from a z-axis direction.

In FIG. 1A, an excitation light source device 300 includes the blue excitation light source 101 for phosphor excitation light and a collimator lens 201 to collimate light rays emitted from the blue excitation light source 101. The blue excitation light rays emitted substantially in parallel from the excitation light source device 300 pass through a dichroic mirror 14, which transmits blue light and which reflects yellow light (for green and red), and are focused through a focusing lens 24 onto a light incidence side of a transparent substrate 27. On a light incidence side of the transparent substrate 27, a dichroic coat 272 which transmits blue light and which reflects yellow light (for green and red) is evaporated. The dichroic coat 272 is applied with a yellow phosphor 271. The yellow phosphor 271 is an Yttrium Aluminum Garnet (YAG) phosphor in general, but any other appropriate material may be employed.

Since part of the blue excitation light reacts with the yellow phosphor 271, yellow light is emitted in all directions. However, yellow diverging light to a light emitting side of the transparent substrate 27 is reflected by the dichroic coat 272. Hence, the yellow light entirely diverges in the direction toward the focusing lens 24. The yellow light rays diverging from the yellow phosphor 271 are substantially collimated through the focusing lens 24 and are reflected by the dichroic mirror 14 to enter the first array lens 3.

Part of the blue light having passed through the transparent substrate 27 is diffused by a diffusion layer arranged on the light emitting side of the transparent substrate 27. The blue light rays are substantially collimated through a collimator 25. The collimated blue light is reflected by reflection mirrors 19 to 23 and passes through the dichroic mirror 14 to enter the first array lens 3.

In short, this is equivalent to an operation in which white light rays are emitted from an emission area 901 of the blue excitation light focused onto the transparent substrate 27 (to be referred to as a first light emission image 901 hereafter) and are substantially collimated to enter the first array lens 3. The functions of the polarization conversion integrator and subsequent constituent components have already been described, and repetitive description thereof is avoided. Assume that the liquid-crystal display element has an aspect ratio of 4:3; each lens cell of the first array lens 3 and the second array lens 4 is 4 mm long in the y-axis direction and 3 mm long in the x-axis direction; and the light shielding plate 60 of the polarization conversion element 5 is 2 mm long in the y-axis direction.

In FIG. 1B, two blue excitation light sources 101 each including a light emitting plane 102 are arranged adjacent to each other in the x-axis direction. The blue excitation light rays emitted from the blue excitation light source 101 are substantially collimated through the collimator lens 201 to be focused by the focusing lens 24 onto the transparent substrate 27 including a yellow phosphor and a blue light diffusion layer. On the transparent substrate 27, there is formed a first light source image 901 which is a magnified projection image of the light emitting plane 102 of the blue excitation light source 101. In this configuration, the collimator lens 201 and the focusing lens 24 have predetermined radii of curvatures to provide a magnification factor of ten.

The collimator lens 201 is provided with a lens apex position which is provided with eccentricity in the x-axis direction so as to prevent the two projected images of the light emitting plane 102 of the blue excitation light sources 101 from overlapping with each other on the transparent substrate 27.

Figure 2A:
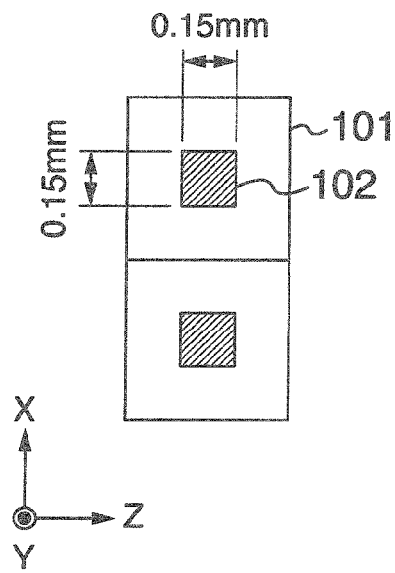
FIG. 2A is a diagram representing a primary section of a light source image according to a first embodiment.
Figure 2B:
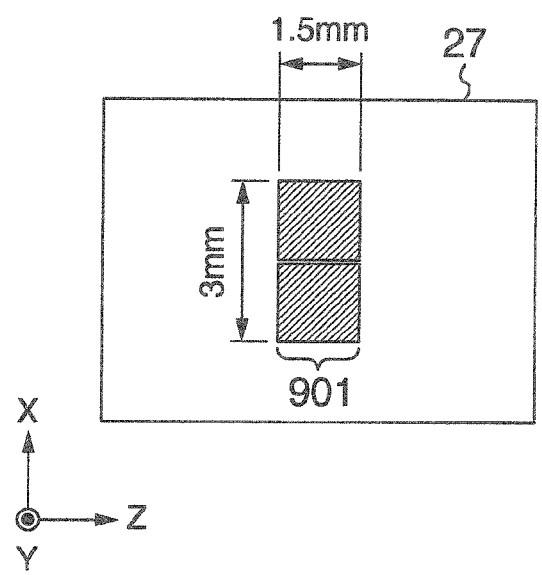
FIG. 2B is a schematic diagram representing a first light source image projected onto a transparent substrate.
Figure 2C:
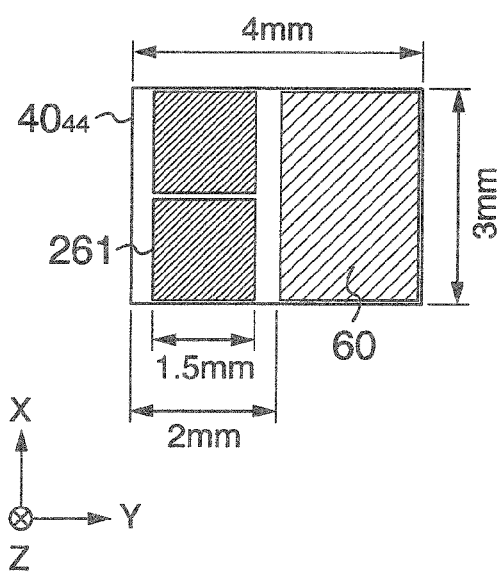
FIG. 2C is a schematic diagram representing a second light source image projected onto a lens cell of a second array lens.
Figure 3A:
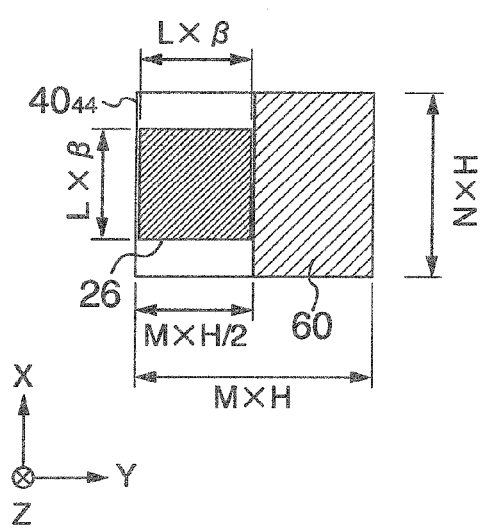
FIG. 3A is a diagram representing a primary section of a light source image according to the prior art, and specifically representing dimensions of primary constituent components.
Figure 3B:
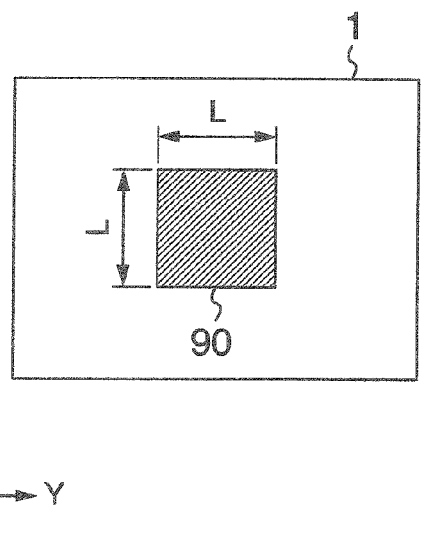
FIG. 3B is a diagram representing a primary section of a light source image according to the prior art, and specifically representing dimensions of a light emitting plane of a light source.

FIG. 2A schematically represents dimensions and arrangement of the respective blue excitation light sources 101 including the light emitting planes 102, respectively. FIG. 2B similarly represents the first light source image 901 projected onto the transparent substrate 27. FIG. 2C schematically represents a second light source image 261 projected onto the lens cell $40_{44}$ of the second array lens 4.

Assume in FIG. 2A that the dimensions of the light emitting plane 102 of the blue excitation light source 101 is 0.15 mm long in the y-axis and 0.15 mm in the x-axis directions. In FIG. 2B, an image on the light emitting plane 102 is magnified by ten to be projected as a magnified image, that is, the first light source image 901 on the transparent substrate 27. Hence, each dimension of the projected image from the light emitting plane 102 is 1.5 mm long in the y-axis and 1.5 mm in the x-axis directions. However, since the images are projected so as not to overlap with each other in the x-axis direction as described above, the dimension of the first light source image 901 is 1.5 mm long in the y-axis direction and 3.0 mm long in the x-axis direction.

For the light emitted from the first light source image 901, the yellow light excited from the yellow phosphor on the transparent substrate 27 is mixed with the blue light diffused in the blue diffusion layer into white light.

Assume in FIG. 2C that the collimator lens 24 and the first array lens 3 are substantially equal in a radius of curvature with each other. The second light source image 261 which is a projected image of the first light source image 901 on the second array lens 4 is substantially equal in the dimension with the first light source image 901, so that the second light source image 261 is 1.5 mm long in the y-axis direction and 3.0 mm long in the x-axis direction.

In this situation, each opening of the second array lens 4 and the polarization conversion element 5 is 2.0 mm long in the y-axis direction and 3.0 mm long in the x-axis direction, that is, the ratio of the area of the second light source image 261 to that of the opening is 75%, which is improved as compared with 66.7% of the prior art.

The light source has an aspect ratio $\alpha$ of 2.0 (=3.0/1.5), and (4N×N)/(M×M)=2.25, so that the relationship of Equation (9), $\alpha < (4N \times N)/(M \times M)$, holds. That is, the dimension of the light emitting plane, the number of excitation light sources, and the positions to allocate the excitation light sources are to be determined to satisfy the relationship of the aspect ratio of the light source. Note that the aspect ratio above is not that of the light emitting plane 102 of the blue excitation light source 101, but is the aspect ratio of the size of the first light source image 901.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A projection type display apparatus, comprising:
   a light source;
   a display element;
   an illumination optical system comprising a plurality of optical elements to enter light from the light source and to emit the light to the display element; and
   a projection lens to magnify an optical image formed by the display element and to project a magnified image of the optical image,
   wherein the illumination optical system comprises:
   a first array lens and a second array lens each includes a plurality of lens elements arranged in a matrix, each of the lens elements having a rectangular shape opening, and
   a polarization conversion element having a polarization conversion function to convert a polarization direction of light incident thereon into a predetermined polarization direction of light and to emit polarized light by use of a plurality of polarized beam splitters and a plurality of half-wave phase plates, the beam splitters and the phase plates being arranged in an array and opposing to the lens elements of the second array lens, and
   wherein the light source comprises a light emitting plane having substantially a rectangle or an ellipse shape, a longitudinal direction of the shape of the light emitting plane being parallel to a longitudinal direction of each opening of the polarization conversion element,
   wherein, a ratio of the longitudinal length of the display element to the vertical length thereof is M/N (M>N), and a ratio of a length in the longitudinal direction of the light emitting plane of the light source to a length in the vertical direction thereof is less than (4N×N)/(M×M).

2. A projection type display apparatus according to claim 1, wherein the light source comprises solid light emitting elements including light emitting diodes, lasers, and organic electroluminescence elements.

3. A projection type display apparatus according to claim 1, wherein the light source comprises solid light emitting elements including light emitting diodes, lasers, and organic electroluminescence elements, the solid light emitting elements emitting excitation light to excite a phosphor.

4. A projection type display apparatus according to claim 1, wherein the light source comprises solid light emitting elements including light emitting diodes, lasers, and organic electroluminescence elements, the solid light emitting elements emitting light which is diffused in a diffusion layer.

* * * * *